United States Patent [19]
Tanabe et al.

[11] Patent Number: 5,613,031
[45] Date of Patent: Mar. 18, 1997

[54] HERMETICALLY SEALED OPTICAL FIBER INSERT STRUCTURE

[75] Inventors: Takashi Tanabe; Kouji Yamamoto, both of Tokyo, Japan

[73] Assignee: NEC Corporation, Tokyo, Japan

[21] Appl. No.: 496,176

[22] Filed: Jun. 28, 1995

[30] Foreign Application Priority Data

Jun. 29, 1994 [JP] Japan .................................. 6-147683

[51] Int. Cl.$^6$ ........................................................ G02B 6/42
[52] U.S. Cl. ............................................. 385/138; 385/94
[58] Field of Search ............................... 385/88–94, 138, 385/139

[56] References Cited

U.S. PATENT DOCUMENTS

| | | | |
|---|---|---|---|
| 4,707,065 | 11/1987 | Jenkins | 385/138 |
| 4,904,046 | 2/1990 | Paschke et al. | 385/138 |
| 5,065,226 | 11/1991 | Kluitmans et al. | 385/92 X |
| 5,293,441 | 3/1994 | Tanisawa | 385/92 |
| 5,386,488 | 1/1995 | Oikawa | 385/92 |

FOREIGN PATENT DOCUMENTS

| | | |
|---|---|---|
| 0337141 | 10/1989 | European Pat. Off. . |
| 3741773 | 6/1989 | Germany . |
| 2-12114 | 1/1990 | Japan . |

OTHER PUBLICATIONS

Patent Abstracts of Japan, vol. 14, No. 150 (P–1025), Mar. 22, 1990 (JP–A–02 012 114, Jan. 17, 1990).

Patent Abstracts of Japan, vol. 14, No. 98 (P–1011), Feb. 22, 1990 (JP–A–01 304 406, Dec. 8, 1989).

*Primary Examiner*—John D. Lee
*Attorney, Agent, or Firm*—Sughrue, Mion, Zinn, Macpeak & Seas

[57] ABSTRACT

A package member has fitted in a through hole thereof a pipe member with an optical fiber inserted therein, the optical fiber including a jacketted part thereof fitted in and soldered to an inside region of the pipe member, with a solder filled therebetween, and a stripped part thereof fitted in and fixed to another inside region of the pipe member, with an adhesive filled therebetween, while the pipe member is fixed to the package member by a welding along a circumference of the through hole, without using a fixing ring, permitting a relatively high hermeticity to be achieved in a facilitated fabrication process.

6 Claims, 3 Drawing Sheets

HERMETICALLY SEALED OPTICAL FIBER INSERT STRUCTURE

BACKGROUND OF THE INVENTION

The present invention relates to a hermetically sealed optical fiber insert structure, and in particular, to a hermetically sealed optical fiber insert structure for inserting an optical fiber into an optical package, such as an optical module, that accommodates therein optical elements.

DESCRIPTION OF THE RELATED ART

Typically, an optical module has accommodated therein various optical elements, such as a light-emitting element, a light-receiving element and a waveguide channel, that need an optical connection in the module to an inserted end of an external optical fiber, which is thus inserted through a package wall of the optical module. The optical elements tend to deteriorate in the air. Hence, the optical module is filled with an atmosphere such as nitrogen, and totally sealed, so that a hermetic sealing is necessitated for the insertion of the optical fiber also and operates as an important factor to a stable performance of the module.

For an increased hermeticity, a conventional sealing method has employed a glassed window, permitting an optical connection therethrough, without the need of directly inserting an optical fiber through a package wall. The window as well as the package wall is hermetically sealed. Free from a direct sealing of a fragile optical fiber, the conventional method is effective to provide a stable hermetic sealing. The method however needs an effective window area, resulting in an increased module size, and additional members such as a lens for the optical connection through the window.

Another conventional sealing method is proposed in the Japanese Patent Laid-Open Publication No. 2-12114 "FIBER INSERT TYPE PACKAGE AND HERMETIC SEALING METHOD THEREFOR", in which an optical fiber is inserted through a package wall, which is hermetically sealed by a soldering or with an adhesive.

FIG. 1 is a sectional view illustrating this conventional method. A package wall 27 of an optical module is formed with a through hole for providing therethrough a pipe 26 with a jacketted fiber 22 fitted therein. The jacketted fiber 22 is fixed to the pipe 26 with an adhesive 28 hermetically filled therebetween. An extension of a bare fiber 21 is hermetically fixed to a reduced end of the pipe 26 by use of a rosin-core solder 29 containing a cleaning flux to remove oxides in a skin region. A fixing ring 23 is soldered to the pipe 26 and the package wall 27. The soldering, designated at 30, provides a hermetic sealing between the package wall 27 and the pipe 26, but contains no cleaning flux, to prevent a migration of the solder. To this point, the soldering 29 between the pipe 26 and the bare fiber 21 is a preliminary process before the insertion of the pipe 26 to the package wall 27, and thus permits the flux to be washed off.

The latter conventional method needs the soldered ring 23 to provide a complete hermetic sealing. Therefore, the flux-free soldering 30 is needed to take competent measures such as by applying a pre-soldering to mating surfaces and securing a sufficient heating temperature and a sufficient heating time. However, the whole package wall 27 is not allowed to experience undue temperatures, and hence an unknown heater is incorporated in the ring 23 for a local heating.

Thus, the latter conventional method also is disadvantageous exemplary in that a special ring 23 is necessary, and that an associated fabrication process should be long and troublesome. Further, the optical fiber fitted in the pipe 26 has a problem such that undue stresses in the fabrication process may cause a breakage in a boundary region between the bare fiber 21 fixed tight by the solder 29 and the jacketted fiber 22 held with the adhesive 28 to be relatively flexible.

The present invention has been achieved with such points in mind.

SUMMARY OF THE INVENTION

It is therefore an object of the present invention to provide a hermetically sealed optical fiber insert structure and a hermetic sealing method therefor, employing no fixing ring, permitting a relatively high hermeticity to be achieved in a facilitated manner.

To achieve the object, the present invention provides a hermetically sealed optical fiber insert structure comprising a package member having an outside wall thereof formed with a through hole, a pipe member fitted in the through hole, and an optical fiber inserted in the pipe member, the optical fiber including a jacketted part in which a bare fiber is jacketted with an insulator and a stripped part in which the bare fiber is stripped of the insulator, the optical fiber having the stripped part fitted in and soldered to a first inside region of the pipe member with a solder filled therebetween, and the jacketted part fitted in and fixed to a second inside region of the pipe member with an adhesive filled therebetween, the pipe member being fixed to the outside wall of the package memger by a welding along a circumference of the through hole.

According to an aspect of the invention, the pipe member comprises an inner pipe made of an Fe—Ni—Co alloy and an outer pipe made of a stainless steel.

According to another aspect of the invention, the stripped part of the optical fiber is covered, between the solder and the adhesive, with a resin deformable to absorb stresses.

Moreover, to achieve the object, the present invention provides a hermetic sealing method for an optical fiber insert structure for inserting an optical fiber into a through hole formed in an outside wall of a package member, the optical fiber including a jacketted part and a stripped part, the method comprising the steps of inserting the optical fiber into a pipe member so that the stripped part is fitted in a first inside region of the pipe member and the jacketted part is fitted in a second inside region of the pipe member, soldering the stripped part to the first inside region of the pipe member by filling a solder therebetween, fixing the jacketted part to the second inside region of the pipe member by filling an adhesive therebetween, providing the stripped part with an optical element coupled to and end thereof, inserting the pipe member, together with the optical fiber fixed therein, into the through hole in the outside wall of the package member, determining a relative position of the pipe member to the package member, and fixing the pipe member to the outside wall of the package member by a welding along a circumference of the through hole.

According to the invention, therefore, a pipe member having an optical fiber inserted therein is heremetically fixed to a package member, without using a fixing ring, thus permitting a relatively high hermeticity to be achieved in a facilitated fabrication process.

BRIEF DESCRIPTION OF THE DRAWINGS

The objects, features and advantages of the present invention will become more apparent from the consideration of the following detailed description taken in conjunction with the accompanying drawings in which.

DESCRIPTION OF THE PREFERRED EMBODIMENTS

Figure 1:
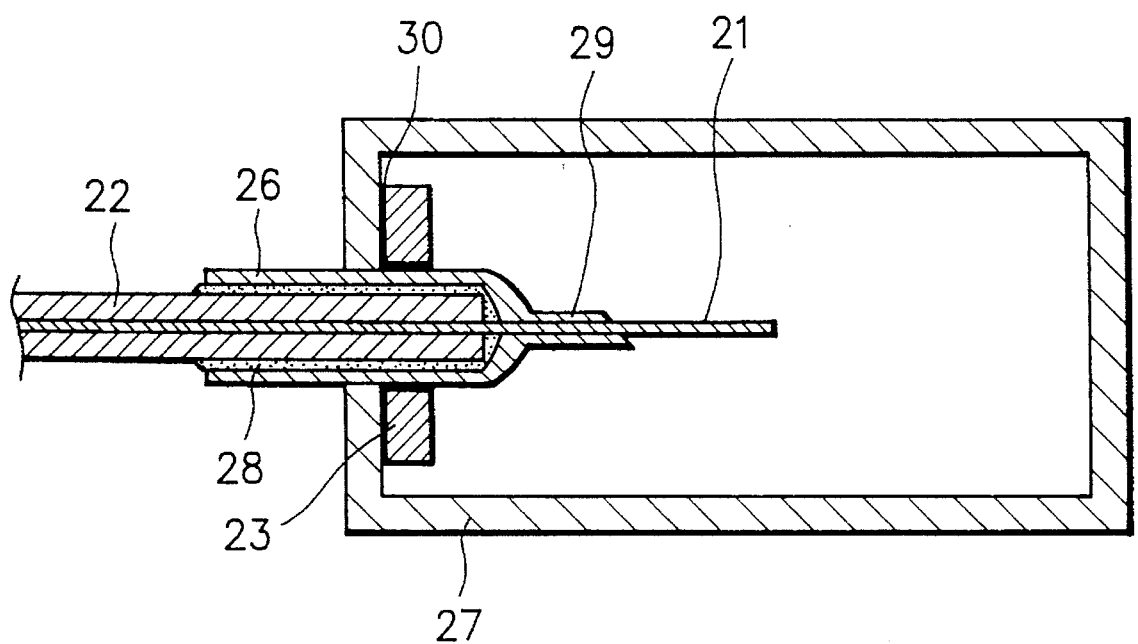
FIG. 1 is a sectional view illustrating a conventional method.
Figure 2:
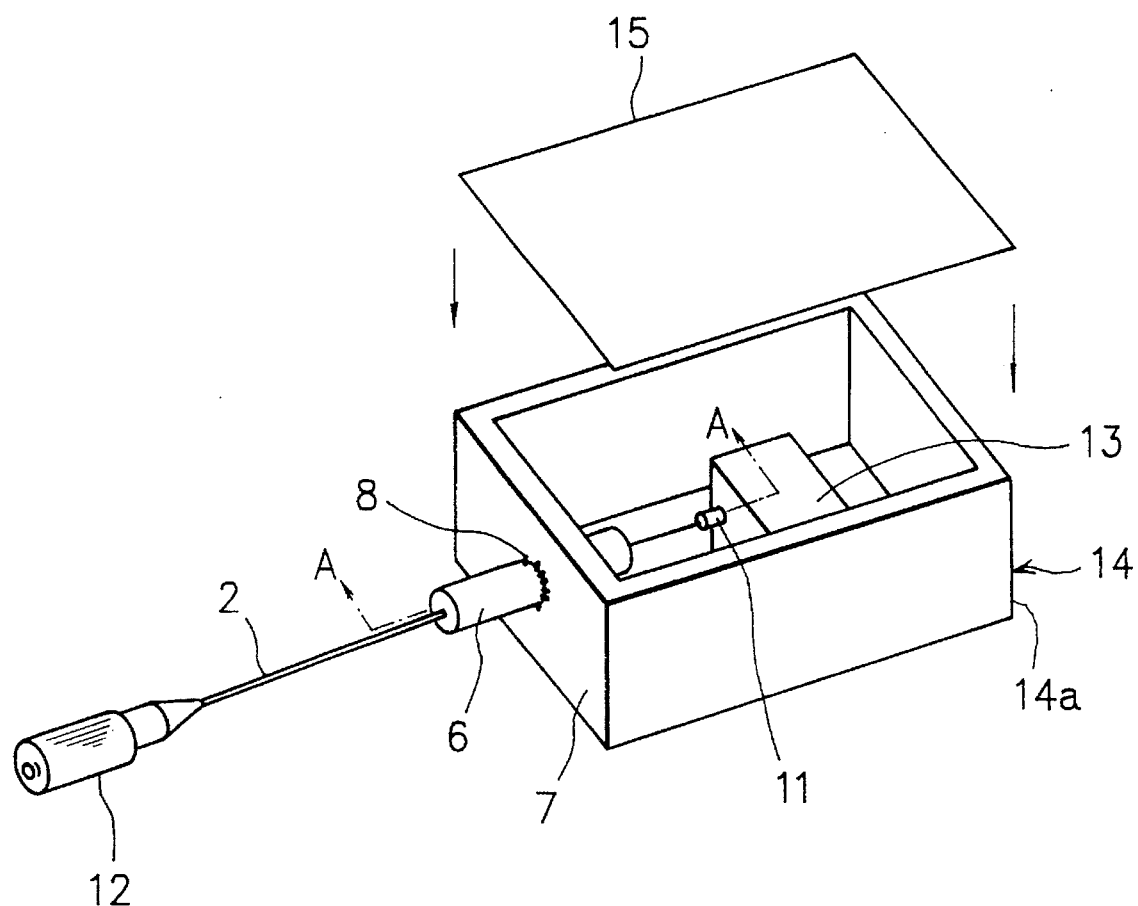
FIG. 2 is a partially exploded perspective view of an optical module including a hermetically sealed optical fiber insert structure according to an embodiment of the present invention.

FIG. 2 shows the entirety of an optical module with a structure according to an embodiment of the invention. An optical element 13 is installed in a package 14 and optically coupled with terminal 11 at an inserted end of an externally extending optical fiber. An optical connector 12 is coupled to an external end of the optical fiber. The insertion of the fiber to the package 14 is effected through a pipe member 6 provided through an outside wall 7 of a container box 14a of the package 14. The pipe member 6 is hermetically YAG ($Y_3Al_5O_{12}$) welded to the wall 7. A lid 15 is seam welded onto the box 14a in a nitrogen atmosphere. An inserted length of the optical fiber, as well as the optical element 13 inside the package 14, is sealed airtight to the outside of the package 14.

Figure 3:
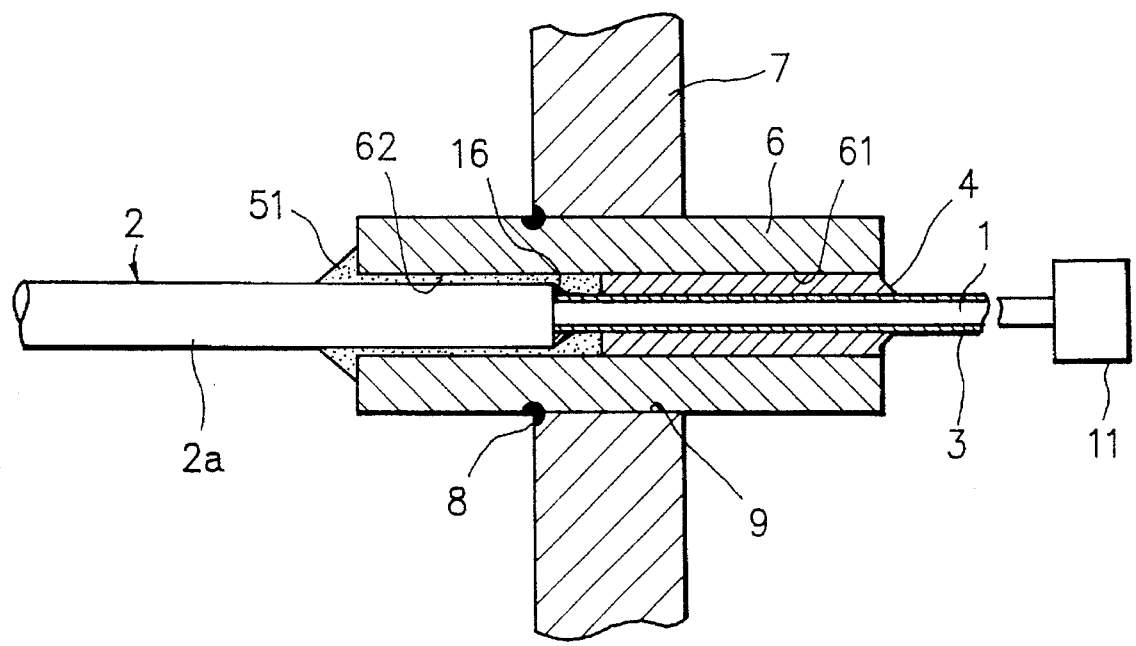
FIG. 3 is a sectional view of the structure along line A—A of FIG. 2.

FIG. 3 shows a sectional view along line A—A of FIG. 2. With reference to FIG. 3, the airtight-sealed optical fiber insert structure will be described along with a fabrication process thereof.

The optical fiber initially comprises a jacketted fiber 2 consisting of a bare fiber 1 and an insulator 2a covering it. Along a corresponding length to the inserted length, the jacketted fiber 2 is stripped of the insulator 2a to have the bare fiber 1 exposed. The bare fiber 1 thus stripped is dipped in a solder to have a solder coating 3 of a thickness ranging from several μm to dozen μm. The fiber 1 coated with the solder 3 is inserted through a gold plated right inside region 61 of the pipe member 6 so that a cut end of the insulator 2a comes near a longitudinally central point of the pipe member 6 and the jacketted fiber 2 is fitted in a left inside region 62 of the member 6. A solder 4 is let into a gap between the bare fiber 1 and the right inside region 61 of the pipe member 6 from the right end, and is heated to be melted by measures such as a high-frequency heating, so that the fiber 1 is hermetically fixed to the pipe member 6.

The jacketted fiber 2 is fixed to the left inside region 62 of the pipe member 6, with an adhesive 51 filled therebetween, covering a boundary region 16 of the fiber 1 between the cut end of the insulator 2a and a left end of the solder 4. The adhesive 51 is relatively flexible to deform to absorb undue stresses. The boundary region 16 may be coated beforehand with a UV resin or an equivalent material to have an improved anti-stress nature. The terminal 11 is coupled to the end of an extension of the bare fiber 1, for a connection to the optical element 13. The optical connector 12 is coupled at the end of the jacketted fiber 2.

The optical fiber hermetically fixed in the pipe member 6 and coupled with the terminal 11 and the optical connector 12 is called "pigtail." The terminal 11 has a smaller outside dimension than an outside diameter of the pipe member 6. Associated parameters such as an insert loss and a quench ratio of the pigtail are measured to ensure conformity.

The pigtail is inserted into the through hole 9 of the package wall 7, so that the bare fiber 1 extends inside the box 14a, with the terminal 11 leading at an established relative position to the optical element 13 or to the package 14, the terminal 11 is fixed to the optical element 13. The pipe member 6 is then hermetically fixed to the package wall 7 by a welding 8 along the whole circumferential length of the through hole 9, using a YAG (yttrium-aluminium-garnet) laser beam. An associated outside region of the pipe member 6 as well as an inside diameter region of the through hole 9 is processed in advance with a small clearance and a low surface roughness.

Figure 4:
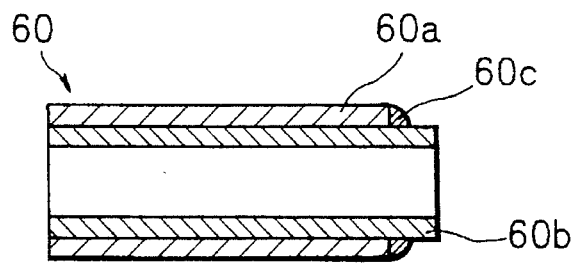
FIG. 4 is a sectional view of a pipe member according to a modification of the embodiment of FIG. 2.

FIG. 4 shows a longitudinal sectional view of a pipe member 60 according to a partial modification of the described embodiment, in which the pipe member 60 has a double tube structure. For a YAG welding between the pipe member 60 and a circumference of a through hole, associated parts are made of selected materials, e.g. stainless steel, Covar, etc. A low carbon stainless steel may preferably be used as a base for the welding. The pipe member 60 comprises an inner pipe 60a made of a Fe—Ni—Co alloy with a linear expansion coefficient of approximately $50 \times 10^{-7} K^{-1}$, substantially equivalent to that of a glass material for optical fibers, with an adapted tendency to absorb thermal stresses, and an outer pipe 60b made of a stainless steel. The inner and outer pipes 60a, 60b are fixed to each other by a welding 60c at either or both ends thereof.

According to the embodiment or modification thereof, a hermetic sealing is achieved, with a YAG welding 8 between a pipe member 6 or 60 and a circumference of a through hole 9, without using a conventional fixing ring while securing a relatively high hermeticity through simple a facilicated fabrication process.

Further, a boundary region 16 between a jacketted fiber 2 fixed with an adhesive 51 and a bare fiber 1 fixed by a welding 4 is coated in advance, with a UV resin flexible to absorb mechanical stresses, thus preventing breakage, assuring a long service life.

While the present invention has been described with reference to the particular illustrative embodiment and partial modification thereof, it is not to be restricted by them but only by the appended claims. It is to be appreciated that those skilled in the art can change or modify the embodiments without departing from the scope and spirit of the present invention.

What is claimed is:

1. A hermetically sealed optical fiber insert structure comprising:

a package member having an outside wall thereof formed with a through hole;

a pipe member of a double tube structure fitted in the through hole; and an optical fiber inserted in the pipe member;

the optical fiber including a jacketted part in which a bare fiber is jacketted with an insulator and a stripped part in which the bare fiber is stripped of the insulator;

the optical fiber having the stripped part fitted in and soldered to a first inside region of the pipe member with a solder filled therebetween, and the jacketted part fitted in and fixed to a second inside region of the pipe member with an adhesive filled therebetween;

the pipe member being fixed to the outside wall of the package member by a welding along a circumference of the through hole.

2. A hermetically sealed optical fiber insert structure according to claim 1, wherein the pipe member comprises an inner pipe made of an Fe—Ni—Co alloy and an outer pipe made of a stainless steel.

3. A hermetically sealed optical fiber insert structure according to claim 1, wherein the stripped part of the optical fiber is covered, between the solder and the adhesive, with a resin deformable to absorb stresses.

4. A hermetically sealed optical fiber insert structure according to claim 1, wherein the optical fiber is coupled at an end of the stripped part to an optical element and at an end of the jacketted part to an optical connector.

5. A hermetically sealed optical fiber insert structure according to claim 1, wherein the package member comprises a container box and a cover plate seam-welded thereto in a nitrogen atmosphere.

6. A hermetically sealed optical fiber insert structure according to claim 1, wherein the first inside region of the pipe member is gold plated.

* * * * *